United States Patent

Rohra et al.

Patent Number: 5,343,696
Date of Patent: Sep. 6, 1994

[54] THRUST REVERSER FOR A PROPFAN ENGINE

[75] Inventors: Alois Rohra, München; Peter Tracksdorf, Gröbenzell, both of Fed. Rep. of Germany

[73] Assignee: MTU Motoren- Und Turbinen-Union, Fed. Rep. of Germany

[21] Appl. No.: 75,510

[22] PCT Filed: Oct. 29, 1991

[86] PCT No.: PCT/EP91/02040
§ 371 Date: Jun. 14, 1993
§ 102(e) Date: Jun. 14, 1993

[87] PCT Pub. No.: WO92/10660
PCT Pub. Date: Jun. 25, 1992

[30] Foreign Application Priority Data

Dec. 13, 1990 [DE] Fed. Rep. of Germany ....... 4039810

[51] Int. Cl.$^5$ .............................................. F02K 3/02
[52] U.S. Cl. .............................. 60/226.2; 239/265.33; 244/110 B; 60/232
[58] Field of Search ...................... 60/226.2, 230, 232; 239/265.33, 265.19; 244/110 B

[56] References Cited

U.S. PATENT DOCUMENTS 2,570,629 10/1945 Anxionnaz et al.
4,802,629 2/1989 Klees .................. 239/265.19

FOREIGN PATENT DOCUMENTS 2446548 4/1975 Fed. Rep. of Germany.
861819 3/1961 United Kingdom.
1565212 4/1980 United Kingdom.
2070691 9/1981 United Kingdom.

Primary Examiner—Louis J. Casaregola
Assistant Examiner—W. J. Wicker
Attorney, Agent, or Firm—Evenson, McKeown, Edwards & Lenahan

[57] ABSTRACT

An engine has a shroud which surrounds one of a propfan and a propeller having blades. The shroud has a variable geometry. A direction of the air flow inside a duct of the shroud is reversible via an adjustment of the blades for the reversal of the thrust of the engine. A separately movable nozzle ring forms a rearward end of the shroud. The nozzle ring is axially displaceable to an extent such that its trailing edge forms wherein air flow is promoted around the end of the shroud.

15 Claims, 7 Drawing Sheets

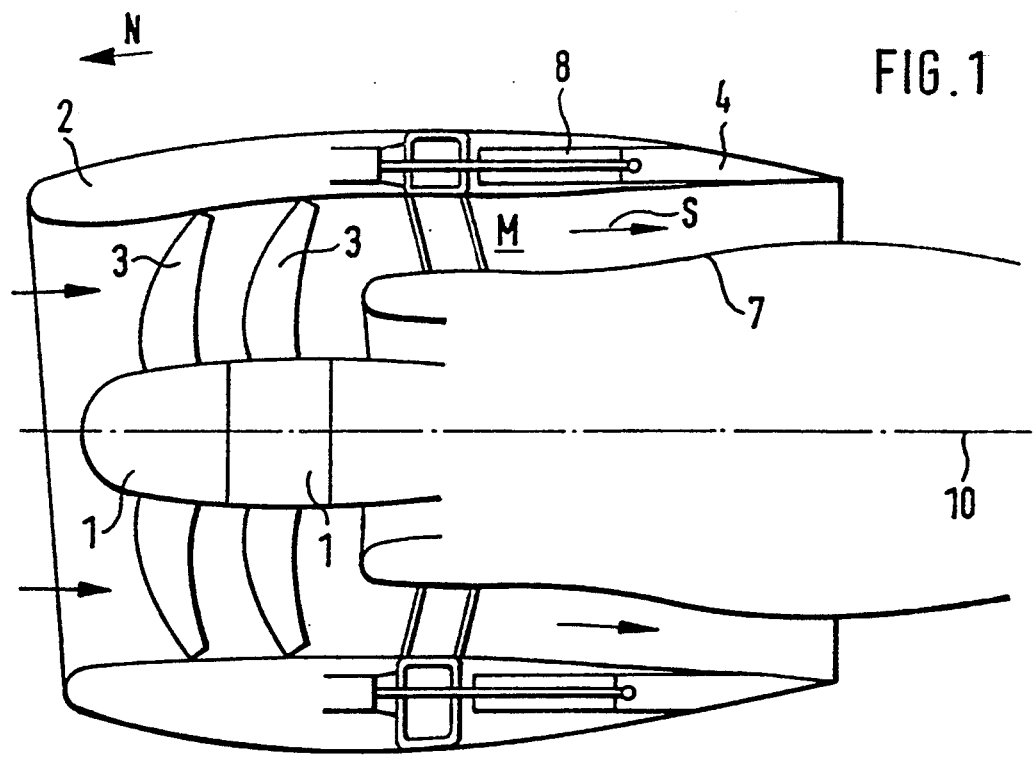
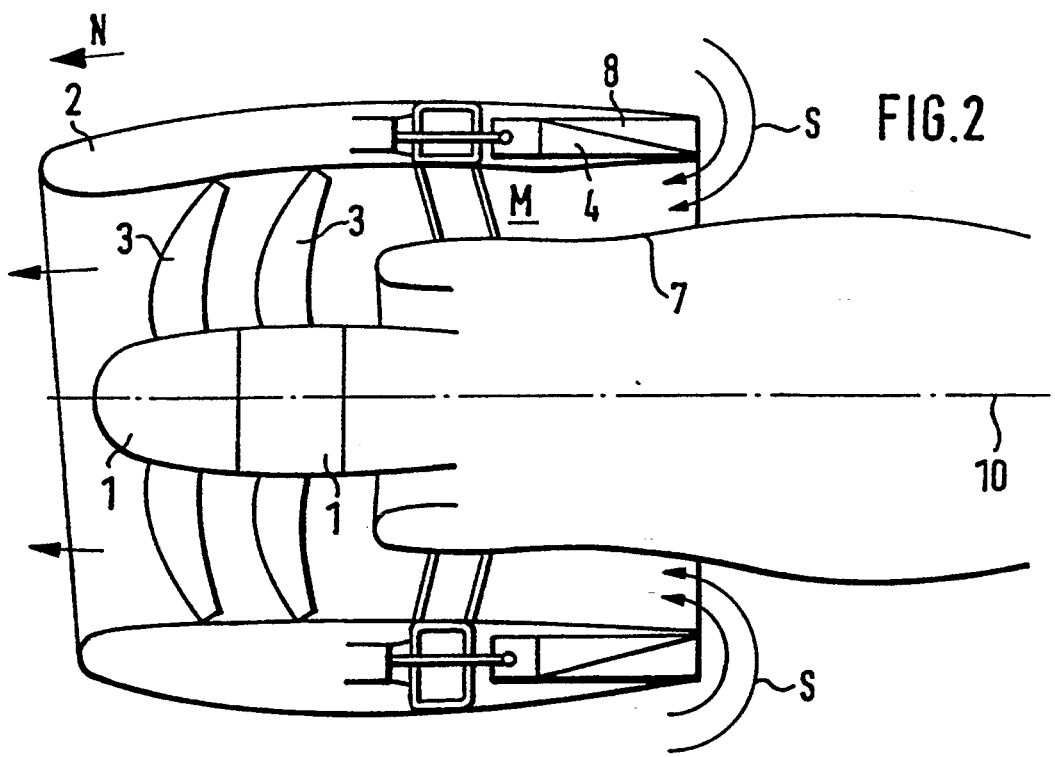

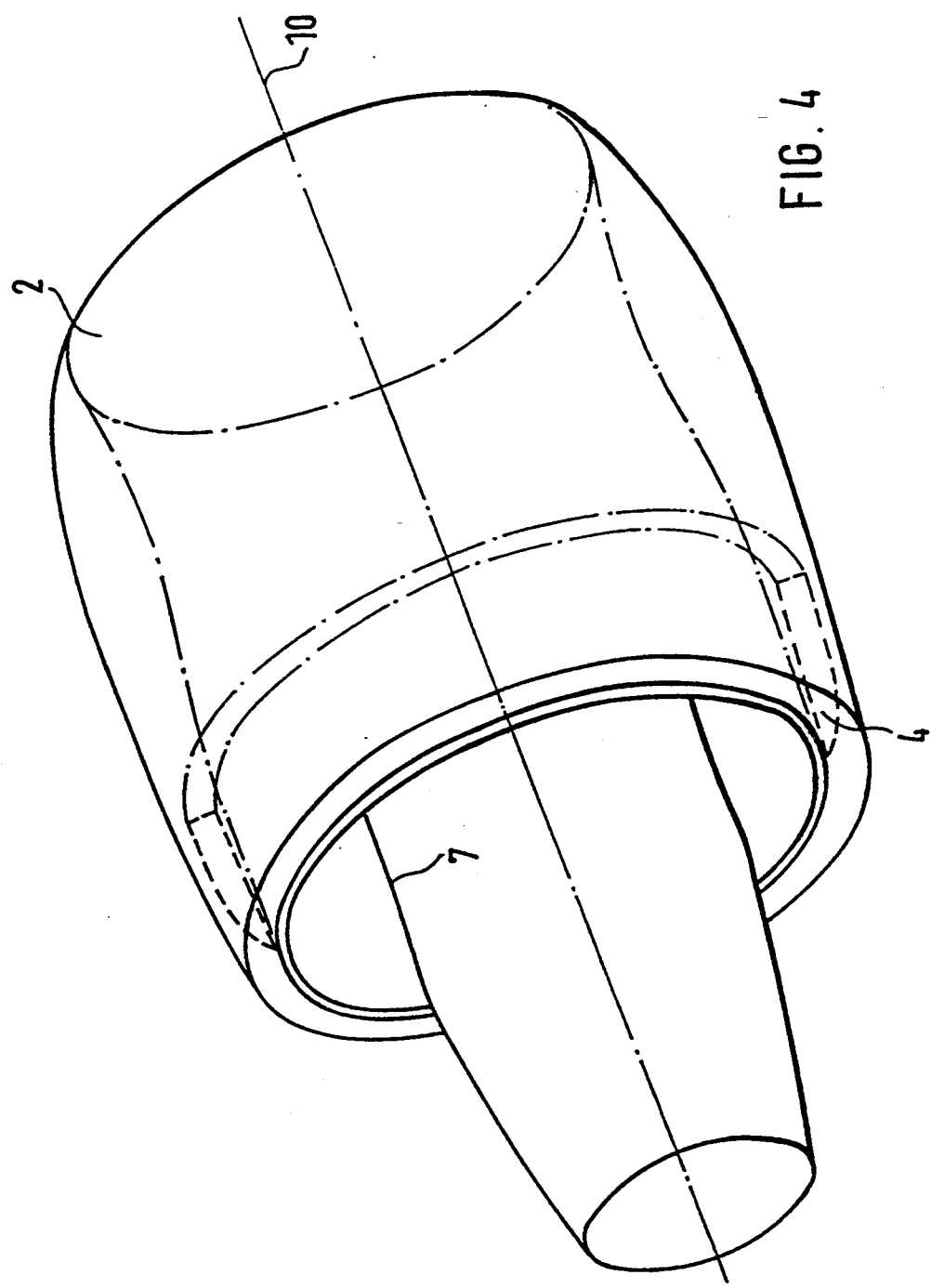

THRUST REVERSER FOR A PROPFAN ENGINE

BACKGROUND AND SUMMARY OF THE INVENTION

The invention relates to a propfan or propeller engine having a shroud which surrounds the propfan or propeller and, more particularly, to a shroud having a variable geometry. The direction of the flow inside the shroud duct is reversible for the reversal of the thrust by adjustable fan blades or propeller blades.

In particular, the invention relates to so-called "UHB-aircraft engines" (Ultra-High-Bypass), thus, the invention relates to engines with a very high bypass ratio, for example, on the order of 10:1. A typical engine of this category has two shrouded contra-rotating propfan rotors. For maintaining an optimal operating point during the different phases of the flight, the blades of the propfan rotors are constructed to be adjustable in their pitch. Furthermore, by a corresponding rotor blade adjustment, a surging of the compressor is avoided.

In order to keep the landing ground roll of an aircraft as short as possible, today's aircraft engines have a thrust reverser. For this purpose, German Patent Document DE-OS 24 46 548 discloses moving the blades of a fan or of a propfan in the reverse position. In this case, the air for generating a reverse thrust is taken in around the trailing edge of the shroud and is blown out inside the shroud duct toward the front in the flight direction.

The quality of the flow around the trailing edge of the shroud is of decisive significance for the braking effect during thrust reversal. In the case of the trailing edge of the shroud which, for a better flow-off in the normal flying operation, is usually designed to be sharp-edged, the flow around the trailing edge in the case of the reversal of the flow direction results in burbling and thus in considerable pressure losses. The available maximal reverse thrust is therefore reduced in an unacceptable manner.

In the case of the engine that has become known in the above-mentioned patent document, during a thrust reversing operation, the flaps which are pivotally connected to the outlet of the shroud are swivelled out in such a manner that they form a bell-shaped inlet opening. The resulting enlarged inlet cross-section has the purpose of causing an improved flow through the fan and thus a larger reverse thrust. However, a burbling in the case of the flow around the sharp trailing edge of the flap with the connected impairment of the thrust reversing effect cannot be prevented or limited. The turbulent flow against the rotor blades caused by the burbling may result in a dangerous excitation of vibrations of the rotor blades.

Based on the above, there is therefore needed an engine of this type developed in such a manner that the aerodynamic flow around the obtuse rearward shroud end and the quality of the flow in the shroud duct are improved and thus the danger of an excitation of vibrations of the rotor blades is reduced. In addition, a sufficient air supply to the core engine must be ensured at the same time.

In an advantageous further development, the displaceable nozzle ring, for the thrust reversal position, is to be moved axially into a ring-shaped pocket of the shroud. This embodiment is distinguished by its simple and light construction. The servicing expenditures remain low because the nozzle ring is formed of one component. This ensures considerable reliability.

In an alternative embodiment, the nozzle ring is composed of several ring segments. It is therefore possible to displace the ring segments with respect to the stationary shroud by swivelling levers axially forward and radially so far toward the outside that the trailing edges of the ring segments form, with the trailing edge of the stationary shroud, an edge of greater radial cross section which promotes the surrounding flow. In this case, the higher air resistance of the shroud when the ring segments are moved out proves to be advantageous without any significant increase of the maximal diameter which would reduce the ground clearance in the case of wing-mounted engines.

Another thrust reversal and braking effect is achieved by an alternative embodiment in which the rearward end of the shroud is constructed as a movable nozzle ring divided into separate ring segments. The individual ring segments, by means of their swivelling levers, can be moved axially forward and radially toward the outside as well as while turning about their body axis which is situated perpendicularly with respect to the translatory moving plane. The ring segments can be moved into such a position that, in their moved-out end position, they assume a position which is offset from the rearward end of the stationary shroud and adjusted with respect to the outer air flow. The trailing edge of the respective ring segment points to the core housing.

As a result, in the moved-out condition, the interior side of the ring segments forms flow ducts with the exterior side of the shroud. The flow ducts guide the air flow in an aerodynamically advantageous manner around the rearward end of the shroud.

In a further development of the invention, swivelling flaps are arranged in sections on the circumference of the shroud, which flaps, in the moved-out condition not only promote the flow around the rearward shroud end but also the face of the engine and thus increase the braking effect. The cause of the favorable surrounding flow is the separating whirl which is generated on the rearward edge of the flap and which has a rounding-off effect for the rearward shroud end. The surrounding flow therefore takes place in a larger radius in which case the risk of burbling is reduced.

In another expedient development, the flaps are coupled with the nozzle ring in such a manner that their movement takes place simultaneously. As a result, an optimal flow-around quality is ensured.

In order not to negatively influence the resistance in normal flight, the outer contour of the moved-in flaps closes off flush with the outer contour of the shroud.

In a preferred development, the shroud duct, which is formed between the core housing, on the one hand, and the interior side of the shroud with the nozzle ring, on the other hand, extends in a divergent manner, that is, forward, in the flow direction during the thrust reversal. When the nozzle ring is moved in, the inlet cross-section will increase and the flow losses will therefore be reduced. The flow losses are a function of the expansion ratio of the shroud duct and of the flow Mach number at the inlet. In a further development, an effective function of the thrust reverser is indicated while the blades are adjusted at the same time as the nozzle ring is displaced.

Other objects, advantages and novel features of the present invention will become apparent from the following detailed description of the invention when considered in conjunction with the accompanying drawings.

BRIEF DESCRIPTION OF THE DRAWINGS

FIG. 1 is a longitudinal sectional view of a propfan engine with a one-piece nozzle ring in the flying condition;

FIG. 2 is a propfan engine according to FIG. 1 during the thrust reversing operation;

FIG. 4 is a view of the propfan engine according to FIG. 3 during the thrust reversing operation;

DETAILED DESCRIPTION OF THE DRAWINGS

FIG. 1 is an axial sectional view of a propfan engine for the propulsion of an aircraft. The propfan engine consists essentially of the two propfan rotors 1, having rotor blades 3, which are situated inside the shroud 2 of an interior gas turbine which is not shown in detail. A nozzle ring 4 closes off the shroud 2. As illustrated in FIG. 1, the air flow passes from the front to the rear through the shroud duct M, for example, during cruising. In this case, the nozzle ring 4 is in the moved-out position.

For the thrust reversal in order to brake the aircraft, the rotor blades 3 and the nozzle ring 4 are moved into the thrust reversal position at the same time as illustrated in FIG. 2. In this case, the air flow S flows around the trailing edges of the shroud 2 before it flows through the shroud duct M toward the front of the engine.

Figure 3:
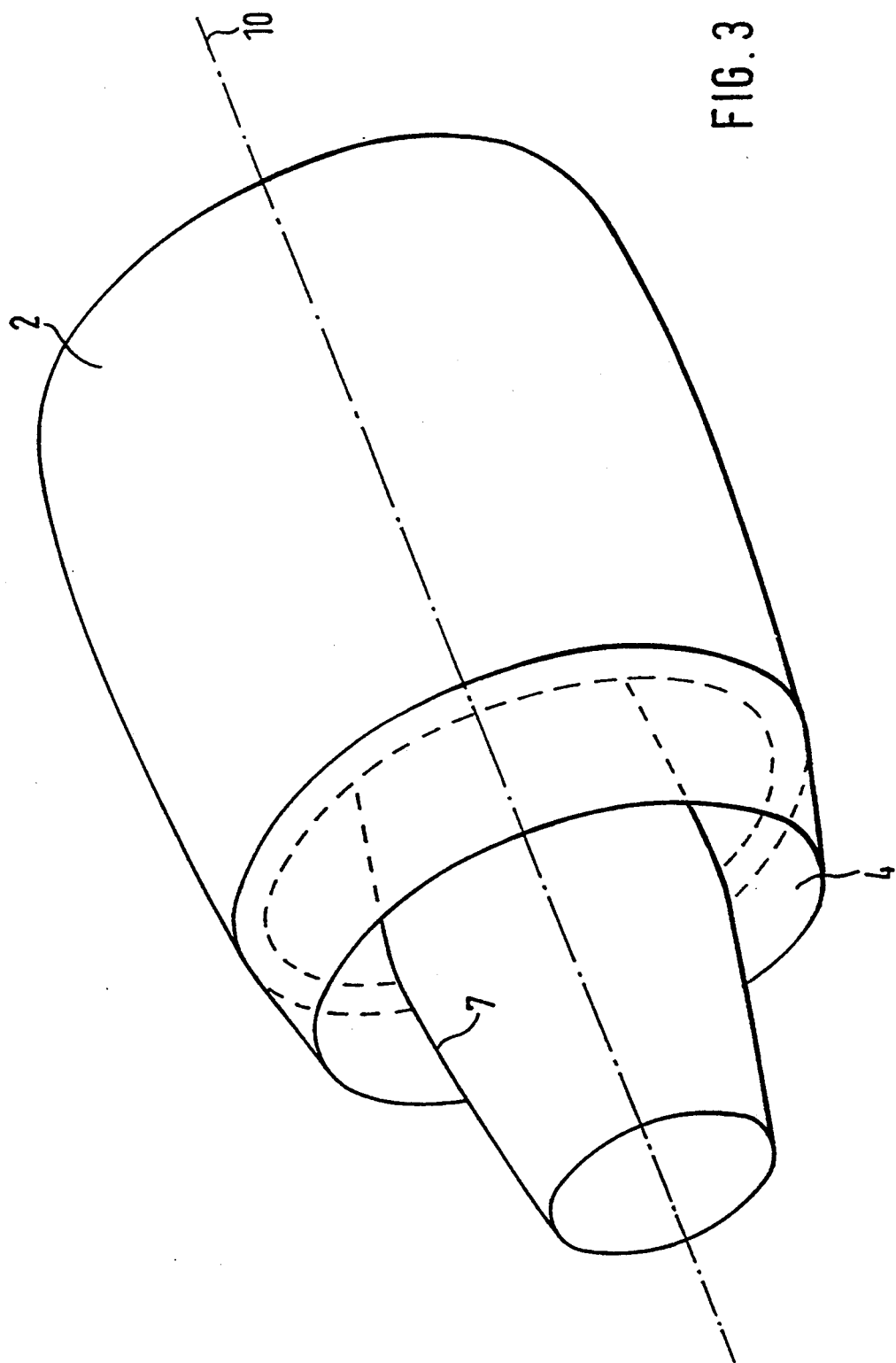
FIG. 3 is an perspective overall view of the propfan engine in the flying condition according to FIG. 1.

FIGS. 3 and 4 are perspective views of the flight or thrust reversal position of the nozzle ring 4.

Figure 6:
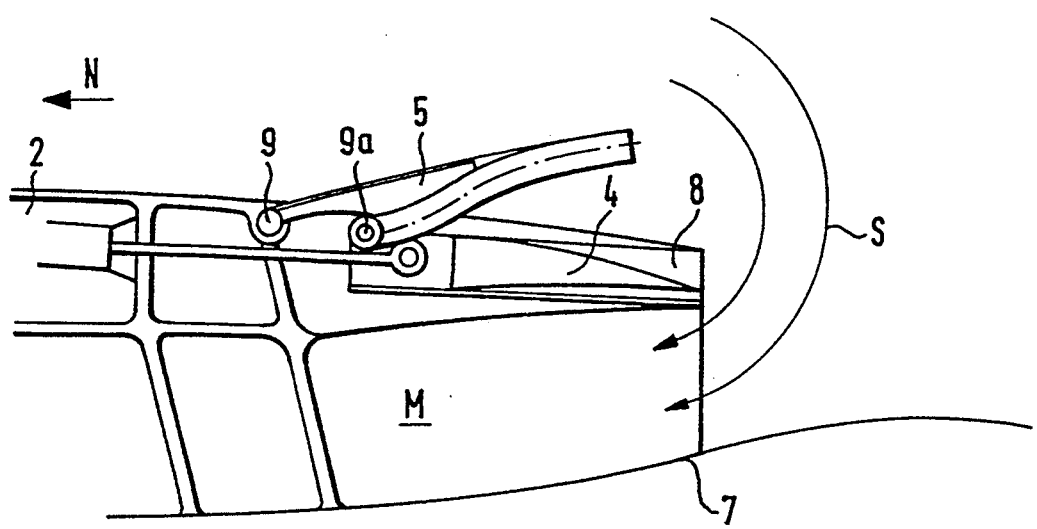
FIG. 6 is a view of the shroud nozzle according to FIG. 5 with the nozzle ring and the flaps situated in the thrust reversing position.
Figure 5:
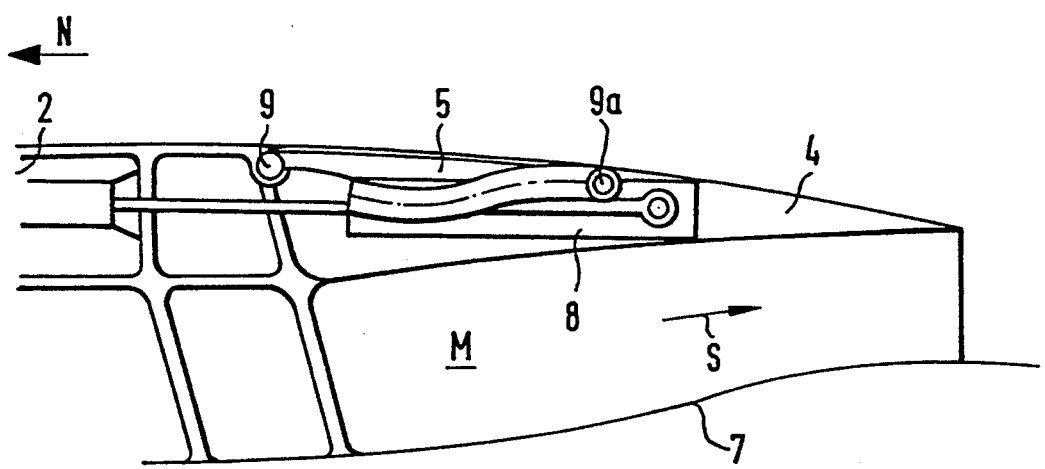
FIG. 5 is a longitudinal sectional view of the rear area of the shroud with the nozzle ring and the flaps in the flying condition.
Figure 7:
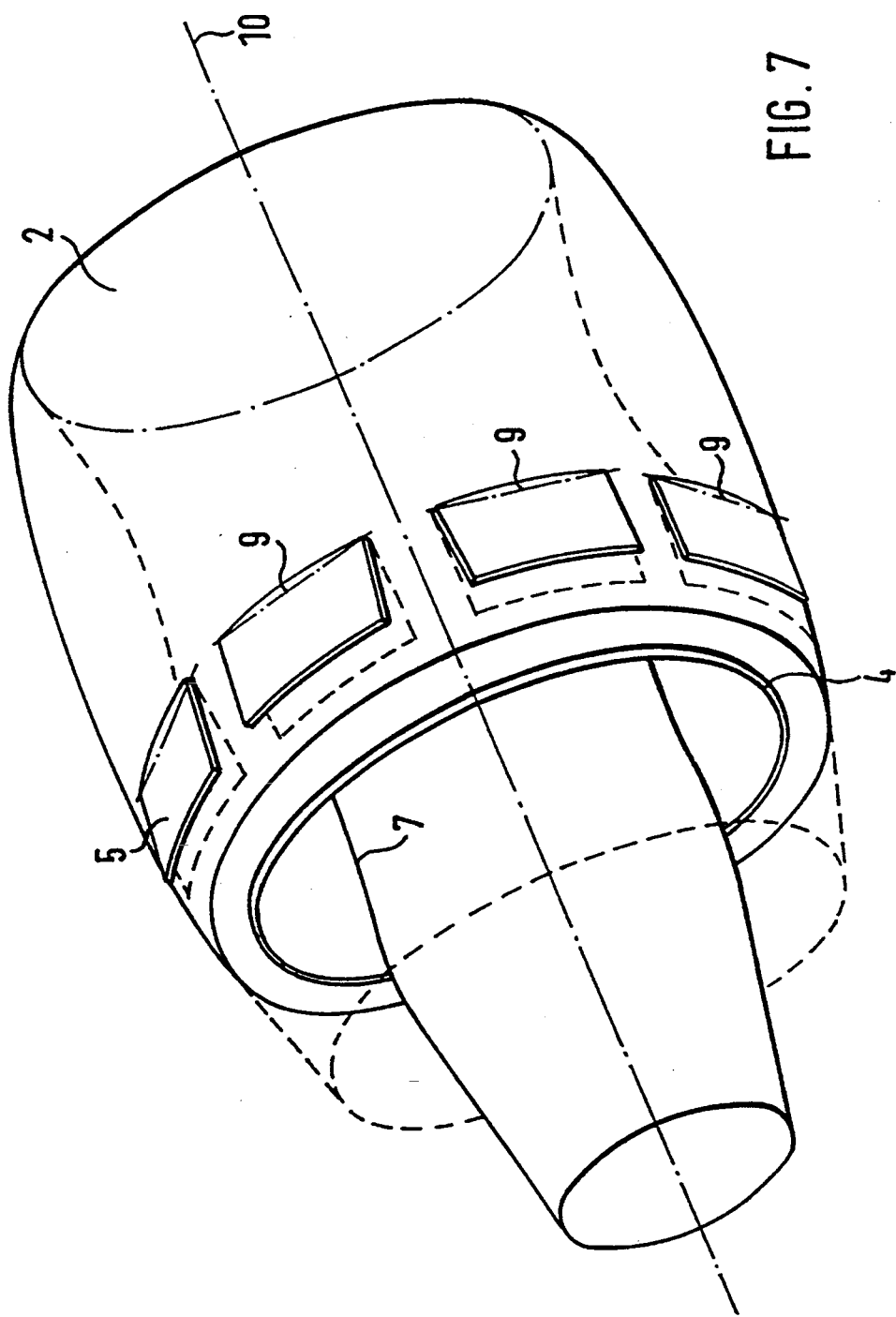
FIG. 7 is an overall view of the shroud according to FIG. 6.

Referring to FIGS. 5–7, in an alternative construction, for improving the surrounding flow in the thrust reversal operation, flaps 5 are actuated at the same time as the nozzle ring 4. In this case, the flaps 5 swivel about a swivel axes 9 toward the outside. The actuating takes place by way of a link which is situated in the flap 5 and in which a roller 9a is arranged. The roller 9a rolls along the link. The roller 9a is disposed on the ring segment 6 (see FIGS. 8 and 9) which moves the link to swivel the flap 5 outward. FIGS. 5 and 6 are longitudinal sectional views of the flight operating position or the thrust reversal position. A perspective view of the propfan engine in the thrust reversal configuration is illustrated in FIG. 7.

Figure 8:
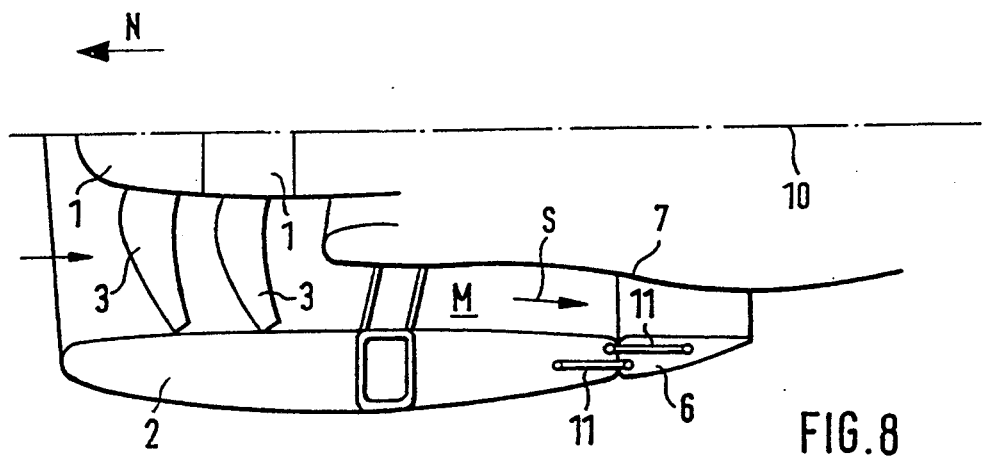
FIG. 8 is a longitudinal sectional view of a propfan engine with a nozzle ring which consists of ring segments, in the flying condition.
Figure 9:
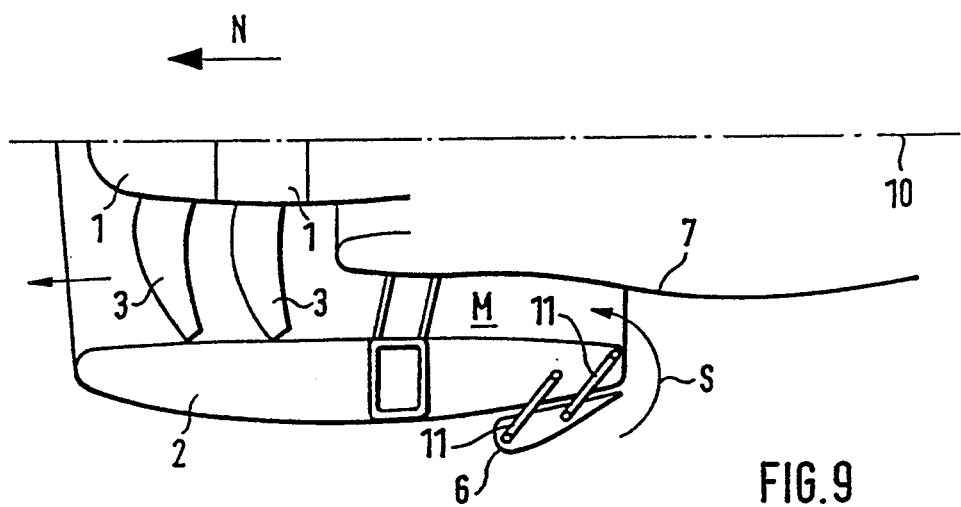
FIG. 9 is a view of the propfan engine according to FIG. 8 with ring segments which are in the thrust reversing position.

Another advantageous embodiment is illustrated in the longitudinal sectional views of FIGS. 8 and 9. The ring segments 6 which, in the flying condition, form the nozzle ring 4 according to FIG. 8, for the thrust reversal, are swivelled by a swivelling lever 11 to the exterior side of the rear shroud 2. In this case, the ring segments 6 rest in their end position concentrically around the shroud 2. The air flow S will then flow around the exterior side of the ring segments 6 and the stationary end of the shroud 2 according to FIG. 9.

Figure 11:
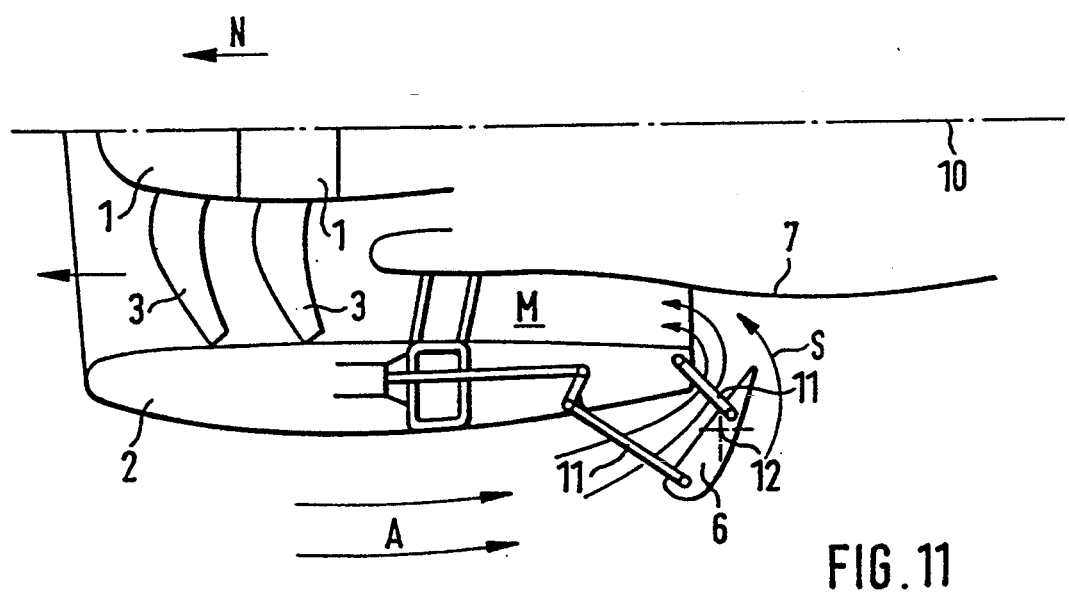
FIG. 11 is a view of the propfan engine according to FIG. 9 with ring segments which are swivelled out for the guiding of air.

As a modification of the ring segment positions illustrated in FIGS. 8 and 9, for the thrust reversal, the ring segments 6 are moved into a position illustrated in FIG. 11 which forms a flow duct leading the air flow S between the end of the shroud 2 and the interior side of the ring segments 6.

Figure 10:
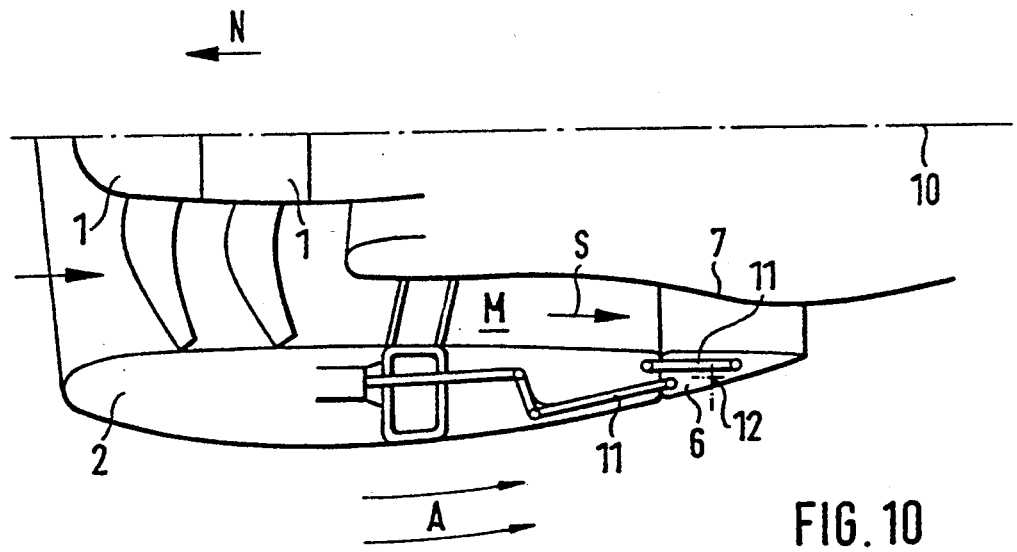
FIG. 10 is a view of an alternative embodiment of the propfan engine according to FIG. 8.

In this regard, FIG. 10, in turn, shows the position of the ring segments 6 during the flight.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. An engine having a shroud which surrounds one of a propfan and a propeller having blades, said shroud having a variable geometry, a direction of an air flow inside a duct of said shroud being reversible via an adjustment of said blades for the reversal of the thrust of said engine, comprising:
    a separately movable nozzle ring forming a rearward end of the shroud, said nozzle ring being axially displaceable to an extent such that its trailing edge forms with an end of the shroud an edge of greater radial cross section than said trailing edge wherein air flow is promoted around said end of the shroud.

2. An engine according to claim 1, wherein the shroud duct, which is formed between a core housing, on the one side, and an interior side of the shroud with the nozzle ring on the other side, extends in a divergent manner in the flight direction.

3. An engine according to claim 1, wherein the actuating for the adjustment of the rotor blades in the thrust reversal position is coupled with the actuating for the displacement of the nozzle ring.

4. An engine according to claim 1, wherein the shroud, on its end facing the nozzle ring, has a ring-shaped pocket which is open toward the nozzle ring and into which the nozzle ring can be axially moved.

5. An engine according to claim 4, wherein the nozzle ring comprises several ring segments.

6. An engine according to claim 1, wherein the nozzle ring comprises several ring segments.

7. An engine according to claim 5, wherein the ring segments are radially displaceable with respect to the shroud via swivelling levers in addition to the axial movement.

8. An engine according to claim 1, wherein flaps, which can be swivelled toward the outside, are distributed in sections on the circumference of the shroud, said flaps having swivelling axes situated transversely with respect to a longitudinal axis of the engine at a distance to the rearward end of the shroud to form a polygonal line on the circumference of the shroud.

9. An engine according to claim 8, wherein outer contours of the flaps in a moved-in position follow an outer contour of the shroud.

10. An engine according to claim 8, wherein the nozzle ring, when the flaps are actuated, is coupled in such a manner that in the thrust reversal operation, the nozzle ring is in a moved-in position and the flaps are in a moved-out position.

11. An engine according to claim 10, wherein outer contours of the flaps in a moved-in position follow an outer contour of the shroud.

12. An engine having a shroud of a variable geometry which surrounds one of a propfan and a propeller, an air flow direction being reversible inside a shroud duct via adjustable blades for thrust reversal, comprising:

a movable nozzle ring formed of a rearward end of the shroud, said nozzle ring being divided into separate ring segments, wherein the individual ring segments, via swivelling levers, can be moved axially forward and radially toward the outside as well as while turning about their body axis which is situated perpendicularly with respect to a translatory moving plane, into such a position that, in their moved-out end position, they assume a position which is offset from the rearward end of the shroud and adjusted with respect to an outer air flow, a trailing edge of the ring segments pointing to a core housing of the engine.

13. An engine according to claim 1, wherein flaps, which can be swivelled toward the outside, are distributed in sections on the circumference of the shroud, said flaps having swivelling axes situated transversely with respect to a longitudinal axis of the engine at a distance to the rearward end of the shroud to form a polygonal line on the circumference of the shroud.

14. An engine according to claim 12, wherein the shroud duct, which is formed between a core housing, on the one side, and an interior side of the shroud with the nozzle ring on the other side, extends in a divergent manner in the flight direction.

15. An engine according to claim 12, wherein the actuating for the adjustment of the rotor blades in the thrust reversal position is coupled with the actuating for the displacement of the nozzle ring.

* * * * *